US012607871B2

(12) United States Patent
Niu

(10) Patent No.: US 12,607,871 B2
(45) Date of Patent: Apr. 21, 2026

(54) FLOATING DISPLAY APPARATUS AND MULTI-LAYER DISPLAY DEVICE COMPRISING SAME

(71) Applicant: SHANGHAI YUPEI PHOTOELECTRIC TECHNOLOGY LIMITED, Shanghai (CN)

(72) Inventor: Lei Niu, Shanghai (CN)

(73) Assignee: SHANGHAI YUPEI PHOTOELECTRIC TECHNOLOGY LIMITED, Shanghai (CN)

( * ) Notice: Subject to any disclaimer, the term of this patent is extended or adjusted under 35 U.S.C. 154(b) by 384 days.

(21) Appl. No.: 18/338,175

(22) Filed: Jun. 20, 2023

(65) Prior Publication Data

US 2023/0341703 A1 Oct. 26, 2023

Related U.S. Application Data

(63) Continuation of application No. PCT/CN2021/136697, filed on Dec. 9, 2021.

(30) Foreign Application Priority Data

Dec. 18, 2020 (CN) .......................... 202011510693.0

(51) Int. Cl.
| | |
|---|---|
| *G02B 30/56* | (2020.01) |
| *G02B 5/18* | (2006.01) |

(Continued)

(52) U.S. Cl.
CPC .......... *G02B 30/56* (2020.01); *G02B 5/1842* (2013.01); *G02B 5/3083* (2013.01); *G02B 27/0966* (2013.01); *G02B 27/283* (2013.01)

(58) Field of Classification Search
CPC ...... G02B 5/005; G02B 5/0284; G02B 30/00; G02B 30/22; G02B 30/34; G02B 30/56;

(Continued)

(56) References Cited

U.S. PATENT DOCUMENTS

| | | | |
|---|---|---|---|
| 10,935,879 B2 * | 3/2021 | Martinez | ................ G03B 21/62 |
| 11,002,987 B2 * | 5/2021 | Nykerk | ................... F21S 43/14 |

(Continued)

FOREIGN PATENT DOCUMENTS

| | | |
|---|---|---|
| CN | 101221282 A | 7/2008 |
| CN | 102200685 A | 9/2011 |

(Continued)

OTHER PUBLICATIONS

Notice of Reasons for Refusal issued for Japanese Patent Application No. 2023-537049, Dispatch date: Jul. 2, 2024, 6 pages including English machine translation.

(Continued)

*Primary Examiner* — Sultan Chowdhury
(74) *Attorney, Agent, or Firm* — HSML P.C.

(57) ABSTRACT

A floating display apparatus includes: an image display unit to have a display plane of an image and to emit display light constituting an initial image from the display plane; and an optical system to define an object plane and an image plane, the optical system being arranged to receive the display light emitted from the display plane at the object plane, wherein the optical system includes a plurality of optical components that are configured to have different abilities to converge light rays in a first direction and a second direction, the first direction and the second direction are orthogonal to an optical axis of the floating display apparatus respectively, and wherein the optical system has an aperture stop for confining light rays from the object plane in the second direction.

14 Claims, 14 Drawing Sheets

(51) Int. Cl.

| | |
|---|---|
| *G02B 5/30* | (2006.01) |
| *G02B 27/09* | (2006.01) |
| *G02B 27/28* | (2006.01) |

(58) Field of Classification Search

CPC .............. G02B 27/095; G02B 27/0955; G02B 27/0966; G02B 27/0988; G02B 27/283

See application file for complete search history.

(56) References Cited

U.S. PATENT DOCUMENTS

| | | | |
|---|---|---|---|
| 2005/0015233 A1* | 1/2005 | Gordon ...................... G03F 1/36 716/51 |
| 2007/0247590 A1 | 10/2007 | Schwerdtner | |
| 2009/0015917 A1 | 1/2009 | Iwamoto et al. | |
| 2010/0195055 A1* | 8/2010 | Maekawa .............. G02B 5/136 353/10 |
| 2013/0083291 A1* | 4/2013 | Smithwick ........... G02B 5/0257 353/7 |
| 2019/0227489 A1* | 7/2019 | Tokuchi ................ G06V 40/113 |
| 2019/0285842 A1* | 9/2019 | Chang ...................... G02B 9/62 |

FOREIGN PATENT DOCUMENTS

| | | | |
|---|---|---|---|
| CN | 102520527 | A | 6/2012 |
| CN | 103676175 | A | 3/2014 |
| CN | 104267573 | A | 1/2015 |
| CN | 204807819 | U | 11/2015 |
| CN | 210666315 | U | 6/2020 |
| JP | H01147421 | A | 6/1989 |
| JP | H11174377 | A | 7/1999 |
| JP | 2007025421 | A | 2/2007 |
| JP | 2011203731 | A | 10/2011 |
| JP | 2017513044 | A | 5/2017 |
| JP | 2019105744 | A | 6/2019 |
| WO | 2021147594 | A1 | 7/2021 |

OTHER PUBLICATIONS

Office Action and Search Report issued for Chinese Patent Application No. 202011510693.0, dated Dec. 4, 2024, 9 pages including English machine translation.

International Search Report and Written Opinion; International Patent Application No. PCT/CN/2021/136697, with English translation (14 pages).

* cited by examiner

100

110

610

603
(101&102)

Image Plane
20

602

601

Object Plane
10

603

810

Object Plane
10              803

801

802

Image Plane
20

802

1610

1800

1810     1820

FLOATING DISPLAY APPARATUS AND MULTI-LAYER DISPLAY DEVICE COMPRISING SAME

TECHNICAL FIELD

Embodiments described herein relate generally to optical field three-dimensional display technology, and more particularly to a floating display apparatus and a multi-layer display device comprising the floating display apparatus.

BACKGROUND

Among the numerous display technologies, in-air floating display technology has attracted the attention of many researchers because it can present images in the air and bring to the viewer a strong visual impact and a sensory experience that appears both real and imaginary.

Conventional floating display technologies include using retroreflectors, double-layer plane mirror arrays, concave mirrors or integrated imaging to achieve floating display. However, for the approaches that use retroreflectors or double-layer plane mirror arrays, the advantage is that they can achieve an aberration-free floating display image with a large field of view, while the disadvantage includes the complicated processing technology and very high cost of retroreflectors or double-layer plane mirror arrays, and due to the need for multiple reflections, there is a ghost image problem at some viewing angles. The main problem of concave mirrors to achieve floating images is that it is difficult to eliminate aberrations such as field curvature, distortion, etc. and the imaging quality is poor under the condition of a large field of view. For the approaches that use integrated imaging, many micro-display units are needed to project floating images in space, which makes it difficult to achieve high resolution and the cost of such screen is too high.

Therefore, there is a need in the art for a new technical solution for floating display.

SUMMARY

It is an object of the exemplary embodiment of the present invention to provide a floating display apparatus that can form a floating image in space while having a lower manufacturing cost and a more flexible optical layout.

Specifically, an exemplary embodiment of the present invention provides a floating display apparatus comprising: an image display unit to have a display plane of an image and to emit display light constituting an initial image from the display plane; and an optical system to define an object plane and an image plane, the optical system being arranged to receive the display light emitted from the display plane at the object plane, wherein the optical system includes a plurality of optical components that are configured to have different abilities to converge light rays in a first direction and a second direction, the first direction and the second direction are orthogonal to an optical axis of the floating display apparatus respectively, wherein the optical system has an aperture stop for confining light rays from the object plane in the second direction, wherein the display light, after propagating through the optical system, forms a floating image at the image plane in the air, wherein an image-side aperture angle in the first direction is larger than an image-side aperture angle in the second direction.

According to another exemplary embodiment of the present invention, a multi-layer display device is also provided, which comprises: a floating display apparatus of the above exemplary embodiment; and a transparent display component being positioned optically downstream of the floating display apparatus, wherein a display plane of the transparent display component is located at a position different from a position of the image plane.

Other characteristics and aspects will become clear through the following detailed description, drawings and claims.

BRIEF DESCRIPTION OF DRAWINGS

The invention may be better understood by describing exemplary embodiments of the invention in conjunction with the accompanying drawings, in which.

DETAILED DESCRIPTION

A detailed description of the present invention will be described below, and it should be noted that, in the detailed description of these embodiments, all features of the actual embodiments may not be described in detail in this description for the sake of brevity and conciseness of the description. It should be understood that, in the actual implementation of any one of the embodiments, just as in the process of any engineering project or design project, in order to achieve the developers' specific goals and in order to meet system-related or business-related restrictions, a variety of concrete decisions are often made, and this varies from one implementation to another. In addition, it should also be understood that, although the effort made in such developing process may be complex and time-consuming, some variations such as design, manufacture and production on the basis of the technical contents disclosed in the disclosure are just customary technical means in the art for one of ordinary skilled in the art associated with the technical contents disclosed in the present disclosure, and the present disclosure should not be construed as insufficient disclosure.

Unless otherwise defined, technical or scientific terms used in the claims and the description shall have the ordinary meaning understood by one of ordinary skills in the art to which this invention belongs. "First", "second," and similar terms used in the description and claims of the present invention do not imply any order, quantity, or importance, but are merely used to distinguish different components. "One", "a/an", or similar terms do not imply any quantitative limitation, but rather means "at least one". "Including" or "comprising" and the like means that an element or item appearing before "including" or "comprising" covers an element or item and its equivalents listed after "including" or "comprising", and does not exclude other elements or items. "Connected", "coupled" and the like are not limited to physical or mechanical connections, nor are they limited to direct or indirect connections. The phrase "A is substantially equal to B" is intended to take into account the manufacturing tolerance, that is, the values of A and B can be within ±10% of each other.

Figure 1:
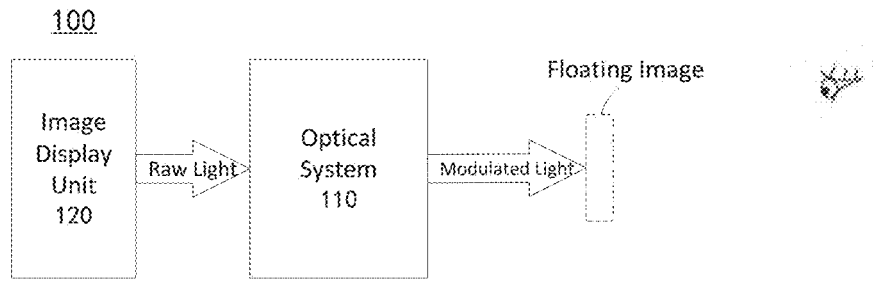
FIG. 1 illustrates a schematic block diagram of a floating display apparatus 100 according to an embodiment of the present invention.

FIG. 1 illustrates a schematic block diagram of a floating display apparatus 100 according to an embodiment of the present invention.

Referring to FIG. 1, the floating display apparatus 100 according to an embodiment of the present invention may include an image display unit 120 and an optical system 110. The image display unit 120 has a display plane of an image and emits display light constituting an initial image from the display plane. The image display unit 120 may employ a direct emissive display method, or may also employ an indirect projection method, to display or project an image on the display plane. The optical system 110 is arranged optically downstream of the image display unit 120 to receive the display light, and has an object plane and an image plane. The object plane may be arranged at the display plane of the image display unit 120 to receive the raw light constituting the initial image at the object plane, and then the raw light is modulated via the optical system 110 to form a floating image (which may also be called an in-air image, at the image plane in the air. Alternatively, it is contemplated that there is also one or more relay optical systems between the image display unit 120 and the optical system 110, and the relay optical systems may image the display plane of the image display unit 120 at the object plane of the optical system 110. In this case, the object plane of the optical system 110 may be located at the image plane in which the display plane of the image display unit 120 is imaged by the one or more relay optical systems.

Figure 2:
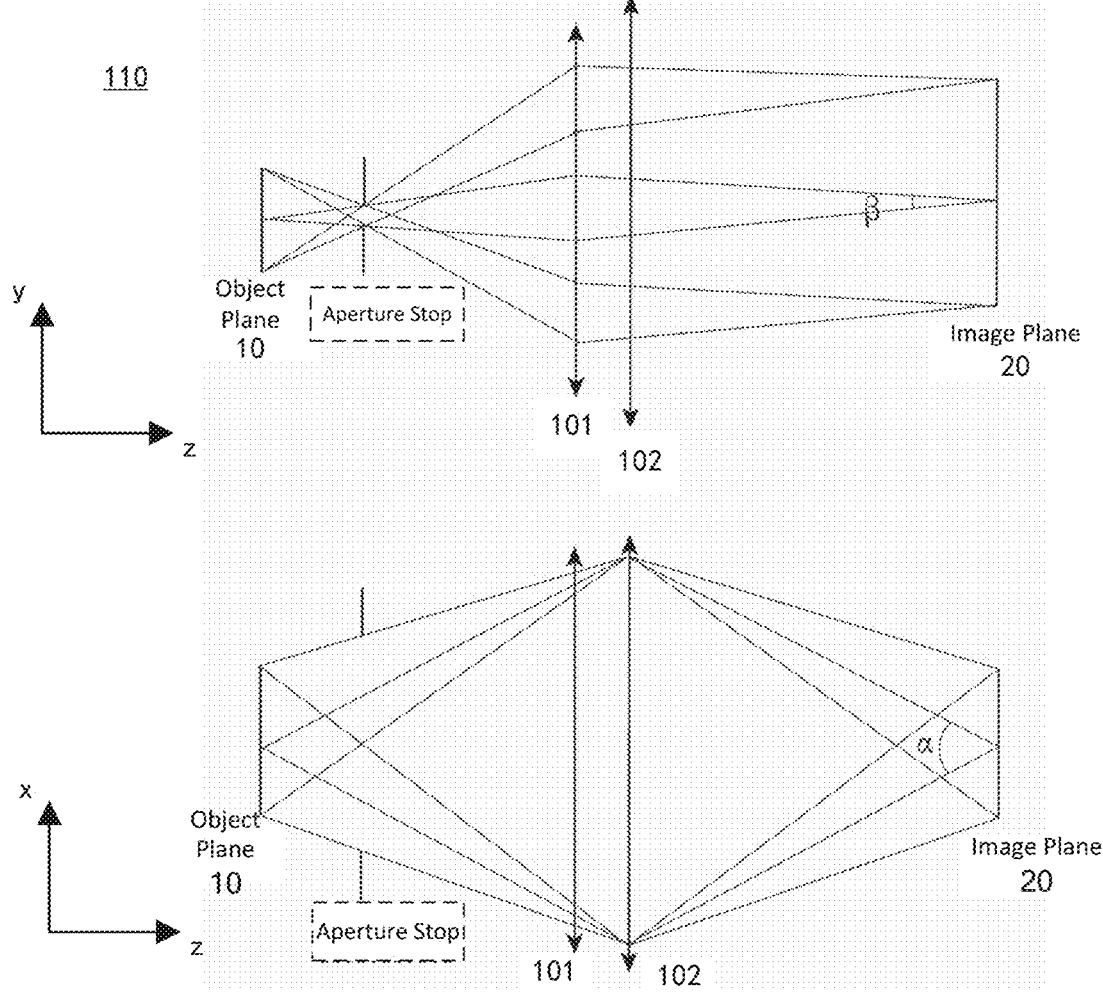
FIG. 2 illustrates a schematic diagram of the principle of propagation of light rays in the horizontal direction and the vertical direction, respectively, of an optical system 110 in a floating display apparatus 100 according to an embodiment of the present invention.

FIG. 2 illustrates a schematic diagram of the principle of propagation of light rays in the horizontal direction and the vertical direction, respectively, of an optical system 110 in a floating display apparatus 100 according to an embodiment of the present invention.

For the sake of description, it can be appreciated that light propagates along an optical path from an optical "upstream" position to an optical "downstream" position in a light beam. Thus, the relative positions of optical elements in the optical path can also be described with these two terms. For example, in FIG. 2, an object plane 10 is located optically upstream of an aperture stop and also located optically upstream of an optical component 101 or 102, and the aperture stop is located optically upstream of a first optical component 101.

Referring to FIG. 2, the optical system 110 may include a plurality of optical components. The plurality of optical components are configured to have different abilities to converge light rays in a first direction and a second direction. The first direction and the second direction may be orthogonal to an optical axis of the optical system 110 respectively. The first direction and the second direction may be orthogonal to each other. As an example, the first direction may be a horizontal direction (x-direction) and the second direction may be a vertical direction (y-direction), with the optical axis along the z-direction, as shown.

In particular, the optical system 110 has an aperture stop for confining light ray from the object plane 10 in the vertical direction (y-direction). In some embodiments of the present invention, the aperture stop may refer to a position in the optical system 110 with a smallest light-through size in the y-direction. In the horizontal direction (x-direction), the aperture stop may be substantially ineffective or slightly confine light ray from the object plane 10. In other words, the aperture stop has a relatively small light-through size in the y-direction and a relatively large light-through size in the x-direction. It can be appreciated by those skilled in the art that the role of the aperture stop may be realized by one optical element in a plurality of optical components, provided that the optical element is capable of confining light rays in the y-direction. In this case, there may be no separate aperture stop in the optical system 110. Therefore, the aperture stop is shown separately in FIG. 2 to enable a clearer explanation of the principle of the invention and not to be restrictive, so it is indicated by a dashed box.

The display light from the image display unit 120, after propagating through the aperture stop and the plurality of optical components, forms a floating image at the image plane 20 in the air, where the image-side aperture angle α in the x-direction is larger than the image-side aperture angle β in the y-direction.

The plurality of optical components may include at least the first optical component 101 and the second optical component 102. The first optical component 101 may be positioned optically downstream of the aforementioned aperture stop, and include a one-dimensional optical element having a positive focal power for converging light rays in the y-direction. The second optical component 102 may include a conjugate imaging element having a one-dimensional grating structure for converging light rays in the x-direction. As an example, the conjugate imaging element having a one-dimensional grating structure may be a one-dimensional retroreflector, a one-dimensional grating transmissive array, a one-dimensional holographic grating, etc. The benefit of employing such a conjugate imaging element is that the relationship of positions (of the object and the image) is conjugate, the image is not enlarged, and there is no aberration.

The second optical component 102 may be positioned between the first optical component 101 and the object plane 10, or between the first optical component 101 and the image plane 20. The present invention is not intended to restrict the relationship between positions of the first optical component 101 and the second optical component 102, and only an exemplary case of the second optical component being positioned between the first optical component 101 and the image plane 20 is illustrated in FIG. 2.

The optical system 110 in the floating display apparatus 100 according to an exemplary embodiment of the present invention is described above. In the optical system 110, an image-side aperture angle of the point on the object plane 10 imaged by a plurality of optical components along the x-direction is relatively large (preferably more than 30 degrees) to satisfy a binocular parallax condition, whereby a floating image can be formed at the image plane 20. An image-side aperture angle of the point on the object plane 10 imaged by a plurality of optical components along the y-direction is relatively small, preferably less than 30 degrees.

Figure 3:
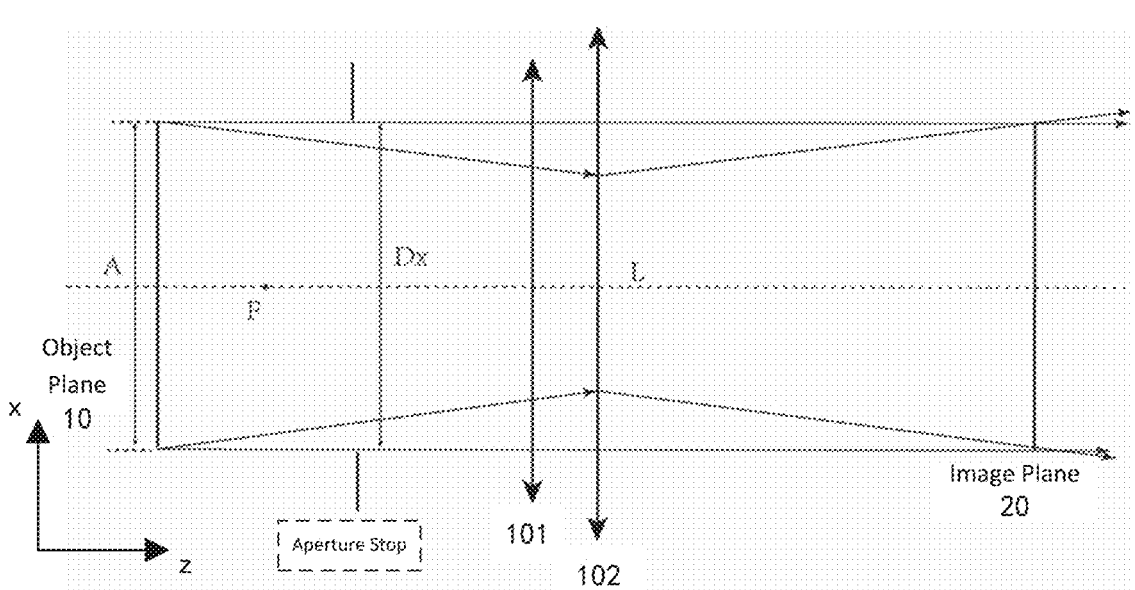
FIG. 3 illustrates a schematic diagram of arrangement of components and propagation of light rays for an optical system 110 in a floating display apparatus 100 in the horizontal direction and the vertical direction respectively according to an embodiment of the present invention.
Figure 3:
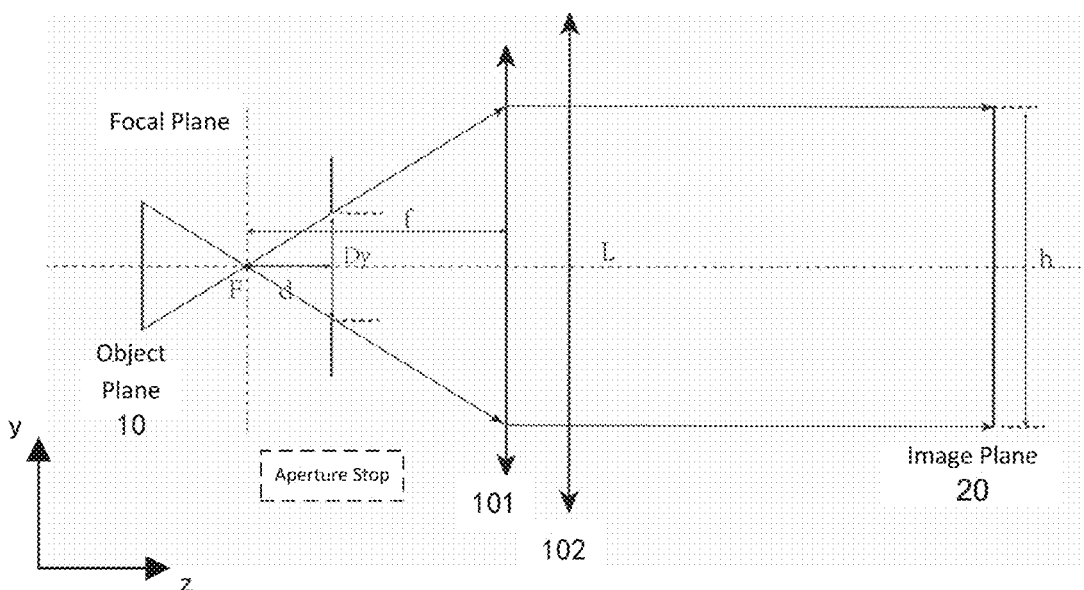

FIG. 3 illustrates a schematic diagram of arrangement of components and propagation of light rays for an optical system 110 in a floating display apparatus 100 in the horizontal direction and the vertical direction respectively according to an embodiment of the present invention.

The aperture stop may have a larger light-through aperture Dx in the x-direction so as not to restrict light rays in the x-direction, thereby obtaining a sufficiently large aperture angle in the x-direction to satisfy a binocular parallax condition for floating display.

The aperture stop may have a smaller light-through aperture Dy in the y-direction to restrict light rays in the y-direction, thereby selecting different portions of the light beam to participate in imaging and improving the imaging quality of off-axis points.

In some embodiments of the present invention, the light-through aperture Dx of the aperture stop may be larger than the height A of the object plane (i.e., the display plane) in the x-direction, i.e., Dx>A. In this way, it can be ensured that light rays from the object plane parallel to the main optical axis can pass through the aperture stop, otherwise a complete floating image cannot be observed because light rays at the edges of the image in the x-direction would not be able to enter into human eyes.

The distance between the aperture stop and the focal plane of the first optical component 101 is d, and the light-through size in the y-direction is Dy, which is smaller than the light-through size of any other optical element in the optical system 110 in the y-direction and satisfies the following condition:

$$Dy \geq \frac{h}{f} * d$$

where h is the length of the floating image in the y-direction, and f is the focal length of the first optical component 101. In this way, it can be ensured that light rays, of which the object plane is parallel to the main optical axis, can pass through the aperture stop, otherwise a complete floating image cannot be observed because the light rays at the edges of the image in the y-direction would not be able to enter into human eyes.

In some embodiments of the present invention, the aperture stop may be placed between the first optical component 101 and the object plane 10. Optionally, the aperture stop may be positioned within a range of ±f centered on the focal plane of the first optical component 101, since the size of the aperture stop in the y-direction will not be higher than the image height of the floating image in the y-direction.

In some embodiments of the present invention, the optical system 110 has a transversal magnification in the x-direction βx=1 and a transversal magnification in the y-direction βy≥1, but this is not restrictive. The advantage of this configuration is that if the transversal magnification in the y-direction βy>1, i.e., the optical system 110 has an effect of magnification on the object plane in the y-direction, the object plane can be configured to be smaller, thus reducing the volume of the whole apparatus.

Optionally, in some embodiments, the optical system 110 may also include a third optical component. The third optical component may be positioned optically upstream of the first optical component 101 (i.e., between the first optical component 101 and the object plane 10) and include a one-dimensional optical element with a positive focus power for modulating light rays from the display plane (i.e., the object plane 10 of the optical system 110) in the second direction (y-direction).

Figure 4:
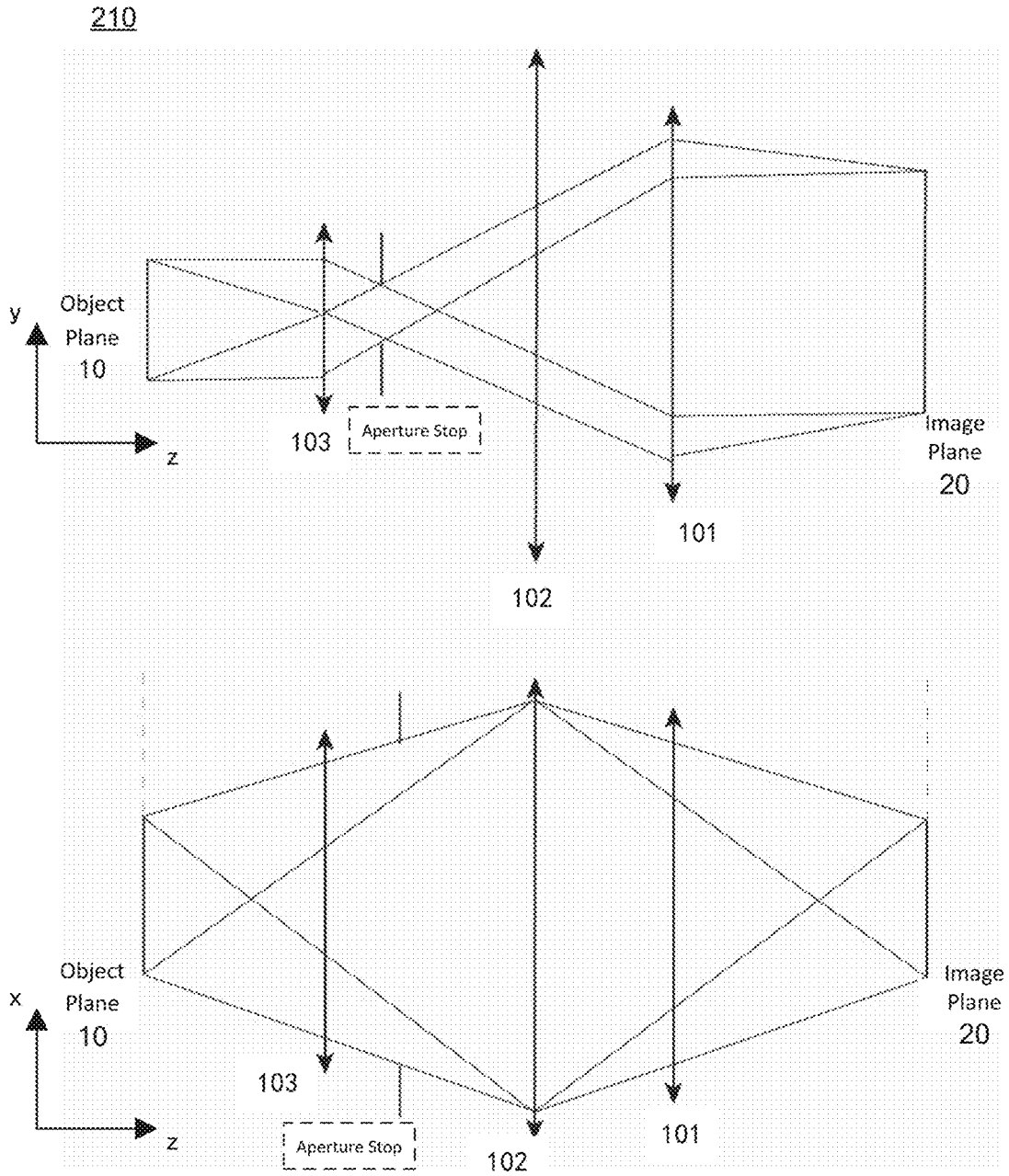
FIG. 4 illustrates a schematic diagram of arrangement of components and propagation of light rays for an optical system 210 in a first direction and a second direction respectively according to an alternative embodiment.

FIG. 4 illustrates a schematic diagram of arrangement of components and propagation of light rays for an optical system 210 in a first direction and a second direction respectively according to an alternative embodiment. Several details of the optical system 210 are identical to those of the optical system 110 as described above with respect to FIGS. 1-3, and will not be repeated herein. The differences of the optical system 210 are mainly described below.

As shown in FIG. 4, a third optical component 103 may be positioned between the second optical component 102 and the object plane 10, and it includes at least one one-dimensional optical element to modulate light rays in the y-direction. The third optical component 103 is designed to balance the distribution of focal power of the optical system to make the layout of the optical system more flexible, while further reducing the aberration and improving the imaging quality.

The light-through size D1 of the first optical component 101 can be greater than or equal to the light-through size D3 of the third optical component 103 in the y-direction. The focal length f1 of the first optical component 101 can be greater than or equal to the focal length f3 of the third optical component 103. Optionally, the distance between the image plane 20 and the first optical component 101 can be within the focal length of the first optical component 101, i.e., d1≤f1, where d1 is the distance between the image plane 20 and the first optical component 101. Optionally, the role of the aperture stop may be realized by the conjugate imaging element having a one-dimensional grating structure in the second optical component 102.

Figure 5:
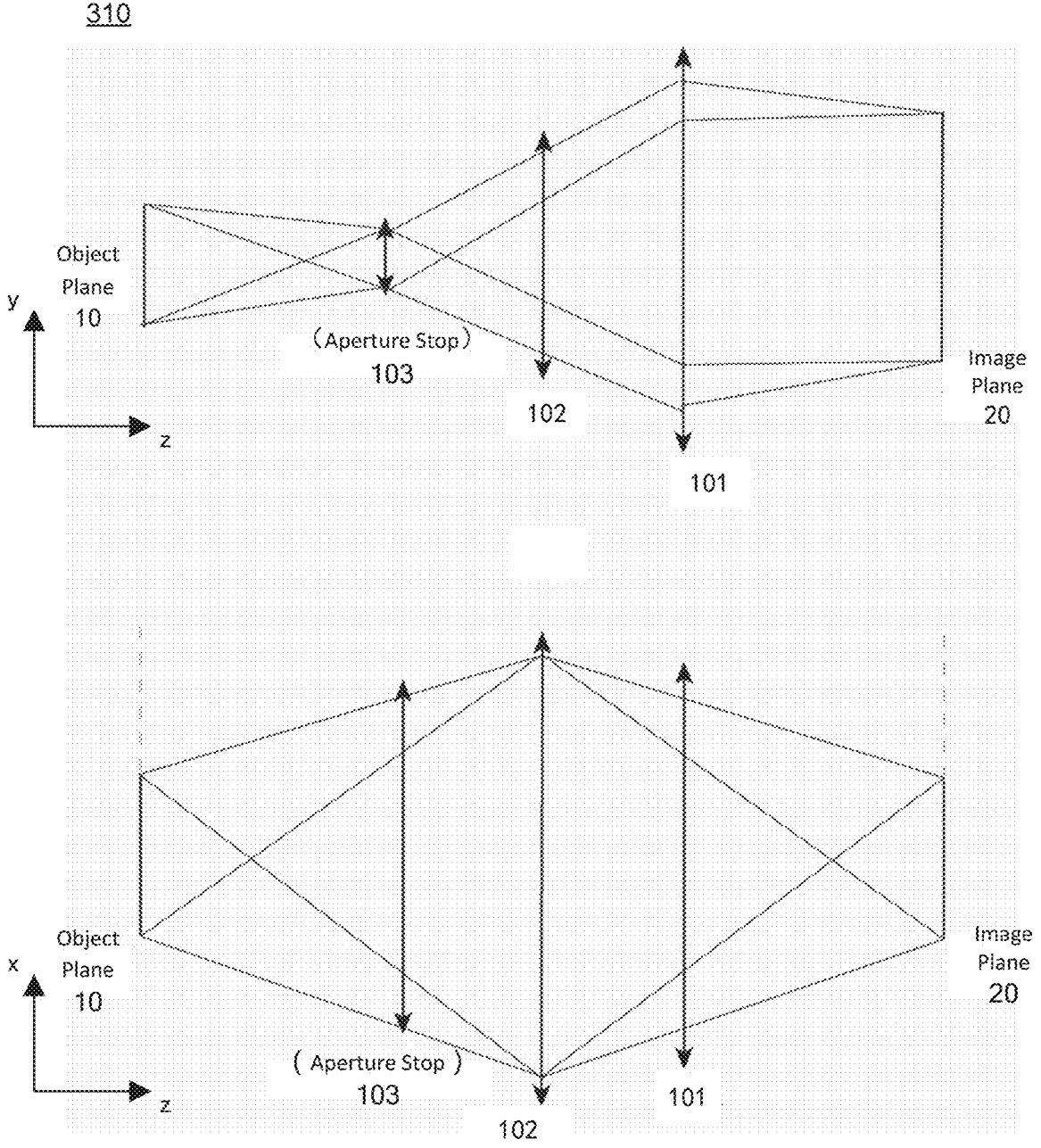
FIG. 5 illustrates a schematic diagram of arrangement of components and propagation of light rays for an optical system 310 in a first direction and a second direction respectively according to a further embodiment.

Optionally, in some further embodiments, the one-dimensional optical element in the third optical component 103 may serve the role of the aforementioned aperture stop, so that the third optical component 103 (in particular the one-dimensional optical element) may be integrated with the aperture stop as a single optical component. Referring to FIG. 5, a schematic diagram of arrangement of components and propagation of light rays of an optical system 310 in a first direction and a second direction respectively is illustrated according to a further embodiment. As shown in FIG. 5, the one-dimensional optical element of the third optical component 103 is an aperture stop. The one-dimensional optical element of the third optical component 103 may have a light-through aperture Dx larger than the height A of the object plane (i.e., the display plane) in the x-direction, i.e., Dx>A. In this way, it can be ensured that light rays from the object plane parallel to the main optical axis can pass through the aperture stop, otherwise a complete floating image cannot be observed because the light rays at edges of the image in the x-direction would not be able to enter into human eyes. The distance between the one-dimensional optical element of the third optical component 103 and the focal plane of the first optical component 101 is d, and the light-through size in the y-direction is Dy, which satisfies the following expression:

$$Dy \geq \frac{h}{f} * d$$

where h is the length of the floating image in the y-direction, and f is the focal length of the first optical component 101. In this way, it can be ensured that light rays from the object plane parallel to the main optical axis can pass through the aperture stop, otherwise a complete floating image cannot be observed because the light rays at edges of the image in the y-direction would not be able to enter into human eyes.

Optionally, the one-dimensional optical element of the third optical component 103 can be positioned within a range of ±f centered on the focal plane of the first optical component 101.

In some embodiments of the present invention, the first optical component 101 and the third optical component 103 may be positioned substantially symmetrical with respect to the conjugate imaging element along the optical axis, and the focal length of the first optical component 101 may be substantially equal to the focal length of the third optical component 103. Preferably, the optical path length between the conjugate imaging element and the object point at the optical axis on the object plane 10 is substantially equal to the optical path length between the conjugate imaging element and the image point at the optical axis on the image plane 20.

Optionally, the aperture stop may be located at the image-side focal plane of the third optical component 103 while being located at the object-side focal plane of the first optical component 101.

Several examples of optical systems in a floating display apparatus according to embodiments of the present invention will be described in the following.

First Example

Figure 6:
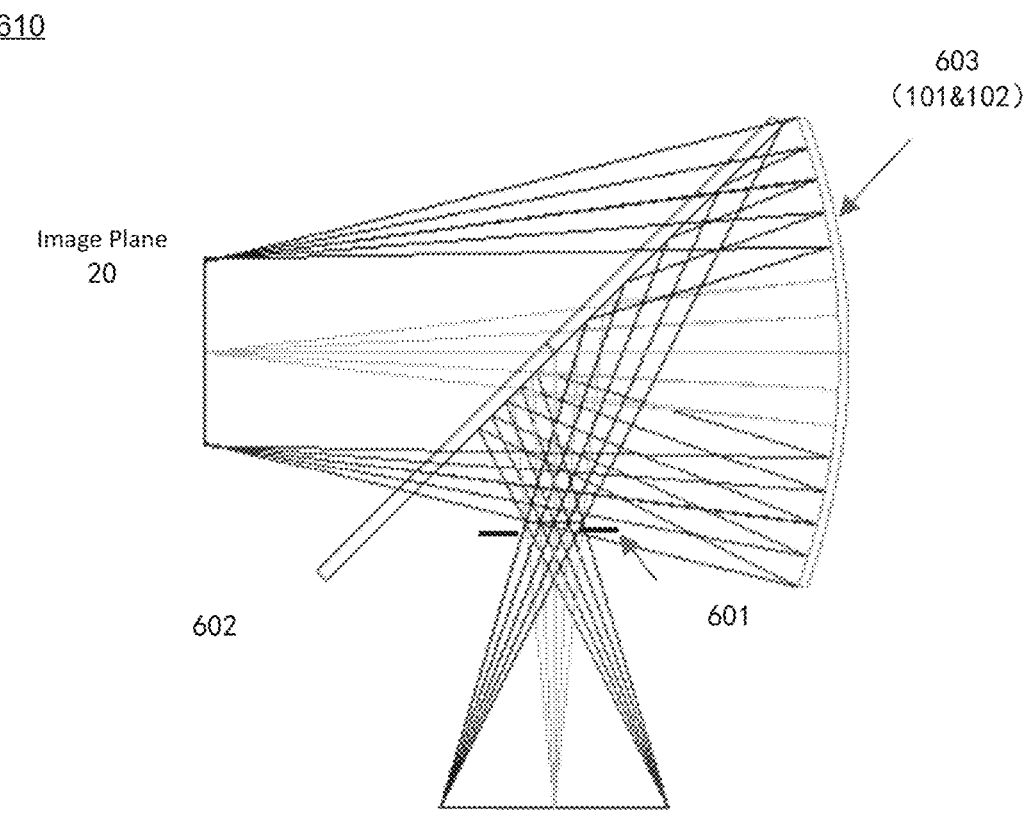
FIG. 6 illustrates a schematic diagram of an optical system 610 and propagation of light rays in a y-z plane according to a first example of the present invention.

FIG. 6 illustrates a schematic diagram of an optical system 610 and propagation of light rays in a y-z plane according to a first example of the present invention. Several details of the optical system 610 in the floating display apparatus according to the first example are identical to those of the optical system 110 as described above with respect to FIGS. 2-3, and will not be repeated herein. The differences of the optical system 610 of the first example are mainly described below.

Figure 7:
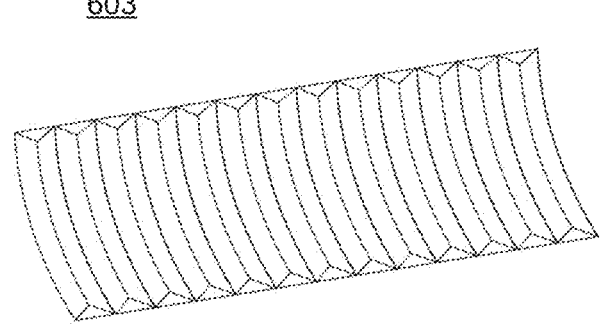
FIG. 7 illustrates an exemplary structure in which a one-dimensional optical element integrates with a one-dimensional retroreflector.

In this example, the optical system 610 may include an aperture stop 601, a beam splitter 602, and an imaging unit 603. In particular, the one-dimensional optical element (e.g., a lens) in the first optical component and the conjugate imaging element with the one-dimensional grating structure (e.g., a one-dimensional retroreflector) in the second optical component are integrally formed as a cylindrical serrated grating, i.e., an imaging unit 603. The imaging unit 603 has a curved surface on one side and a one-dimensional serrated structure on the other side, which is an isosceles triangular structure with a vertex angle of 90 degrees, as shown in FIG. 7.

As shown in FIG. 6, the light beam emitted from the object plane 10 is filtered by the aperture stop and incident on the beam splitter 602, a portion of the light for imaging is reflected by the beam splitter 602 to the one-dimensional serrated structure of the imaging unit 603, and the light reflected back from the one-dimensional serrated structure is transmitted by the beam splitter 602 to the image plane 20 to form a floating image. Optionally, both the object plane 10 and the image plane 20 are located at 2f (twice the focal length) of the imaging unit 603, where f is the focal length of the imaging unit 603 in the second direction (y-direction).

In this way, points on the display plane of the image display unit 120 that are imaged through the optical system 610 along the x-direction have a relatively large image-side aperture angle, satisfying the binocular parallax condition, whereby a floating image can be formed at the image plane 20. Points on the display plane of the image display unit 120 that are imaged through the optical system 610 along the y-direction have a relatively small image-side aperture angle to obtain high imaging quality.

Second Example

Figure 8:
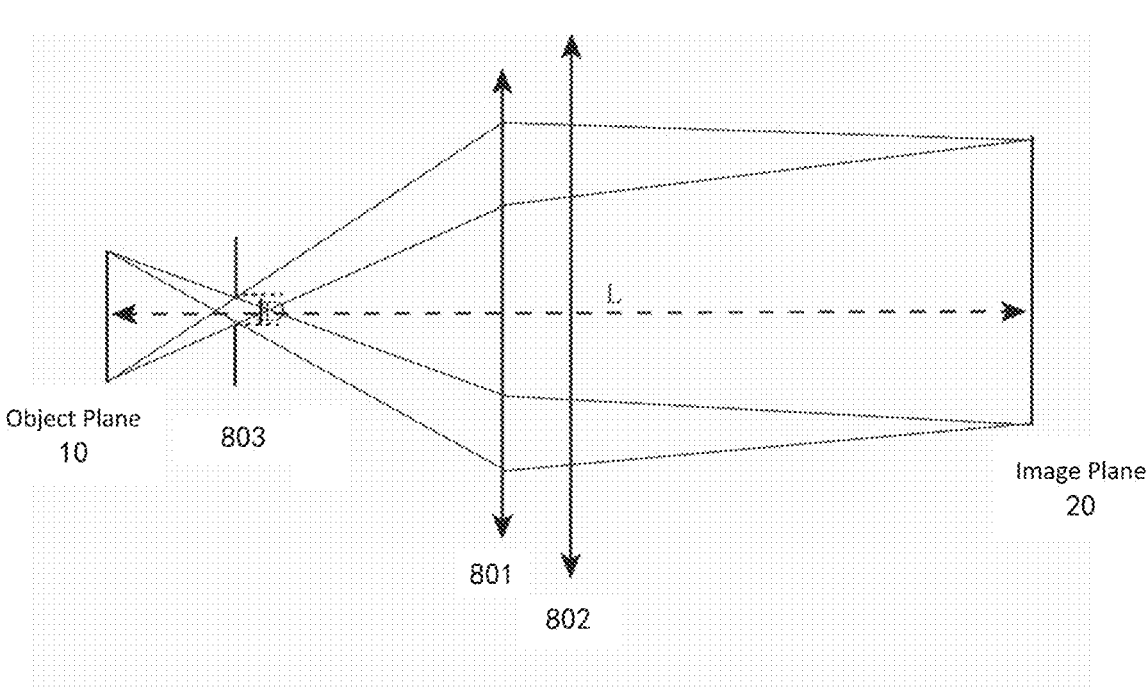
FIG. 8 illustrates a schematic diagram of an optical system 810 and propagation of light rays in a y-z plane according to a second example of the present invention.

FIG. 8 illustrates a schematic diagram of an optical system 810 and propagation of light rays in a y-z plane according to a second example of the present invention. Several details of the optical system 810 in the floating display apparatus according to the second example are identical to those of the optical system 110 as described above with respect to FIGS. 2-3, and will not be repeated herein. The differences of the optical system 810 of the second example are mainly described below.

Figure 9:
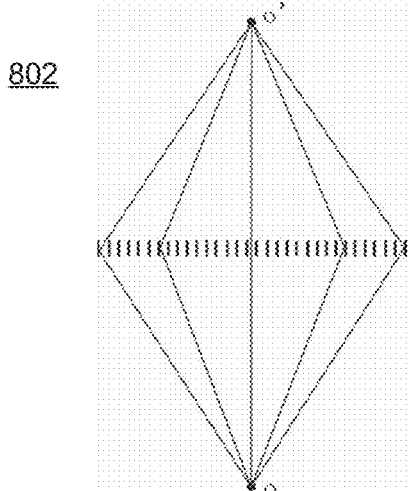
FIG. 9 illustrates an example of a one-dimensional grating transmissive array structure 802.

In this example, the optical system 810 may include a cylindrical lens 801 (the first optical component), a one-dimensional grating transmissive array structure 802 (the second optical component), and an aperture stop 803. The distance between the cylindrical lens and the object plane may be set to be within a range from f (the focal length) to 2f (twice the focal length) of the cylindrical lens so that the optical system 810 may form an enlarged floating image in the y-direction. An example of the one-dimensional grating transmissive array structure 802 is shown in FIG. 9, and the one-dimensional grating transmissive array structure may consist of several parallel glass plates adhered together, where the adhered surfaces are coated with a metallic reflective film, where the object point o is optically conjugated to the image point o', and the object plane and image plane of the structure are equal in size without aberration.

In this way, points on the display plane of the image display unit 120 that are imaged through the optical system 810 along the x-direction have a relatively large image-side aperture angle, satisfying the binocular parallax condition, whereby a floating image can be formed at the image plane 20.

Points on the display plane of the image display unit 120 that are imaged through the optical system 810 along the y-direction have a relatively small image-side aperture angle to obtain high imaging quality.

Third Example

Figure 10:
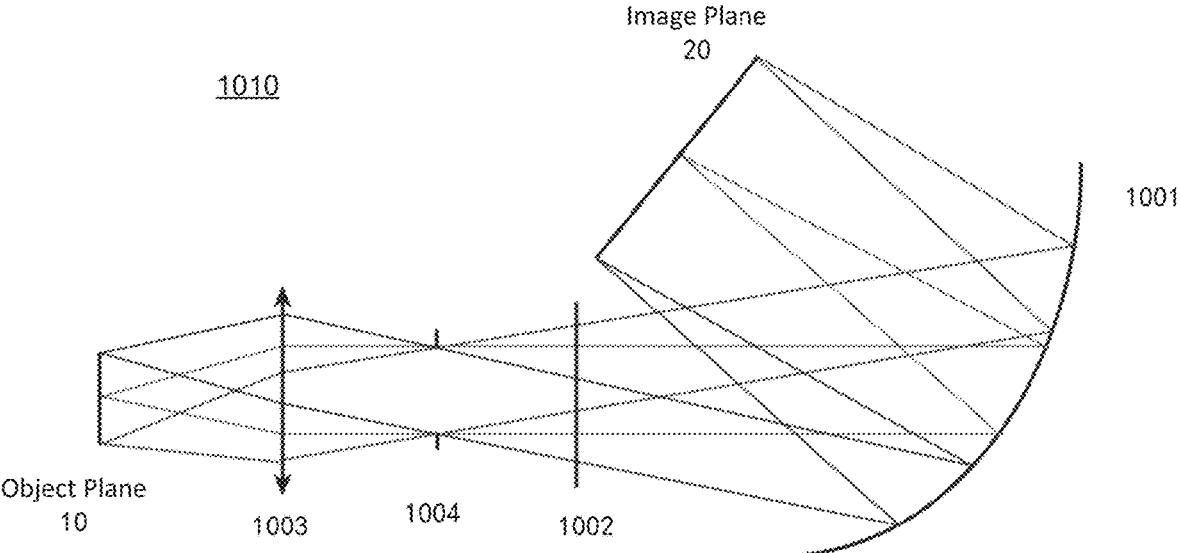
FIG. 10 illustrates a schematic diagram of an optical system 1010 and propagation of light rays in a y-z plane according to a third example of the present invention.

FIG. 10 illustrates a schematic diagram of an optical system 1010 and propagation of light rays in a y-z plane according to a third example of the present invention. Several details of the optical system 1010 in the floating display apparatus according to the third example are identical to those of the optical system 210 as described above with respect to FIG. 4, and will not be repeated herein. The differences of the optical system 1010 of the third example are mainly described below.

In this example, the optical system 1010 may include a free-form mirror 1001 (the first optical component), a one-dimensional grating transmissive array structure 1002 (the second optical component), a one-dimensional optical element 1003 (the third optical component), and an aperture stop 1004. As shown, the free-form mirror 1001 may be arranged optically downstream of the one-dimensional transmissive phase conjugate element 1002 and arranged to reflect the light transmitted from the one-dimensional grating transmissive array structure 1002 to the image plane 20.

In this way, points on the display plane of the image display unit 120 that are imaged through the optical system 1010 along the x-direction have a relatively large image-side aperture angle, satisfying the binocular parallax condition, whereby a floating image having a parallax in the x-direction can be formed at the image plane 20, resulting in a technical effect of forming a certain angle between the floating image and the optical system 1010.

Fourth Example

Figure 11:
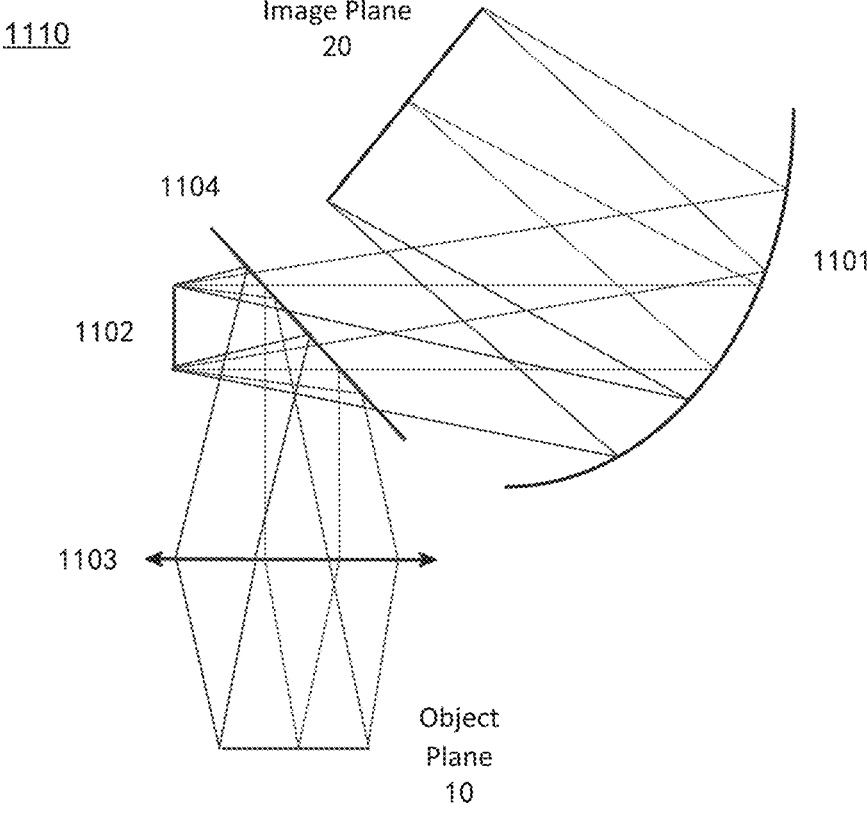
FIG. 11 illustrates a schematic diagram of an optical system 1110 and propagation of light rays in a y-z plane according to a fourth example of the present invention.

FIG. 11 illustrates a schematic diagram of an optical system 1110 and propagation of light rays in a y-z plane according to a fourth example of the present invention. Several details of the optical system 1110 in the floating display apparatus according to the fourth example are identical to those of the optical system 110 or 210 as described above with respect to FIGS. 2-4, and will not be repeated herein. The differences of the optical system 1110 of the fourth example are mainly described below.

Figure 12:
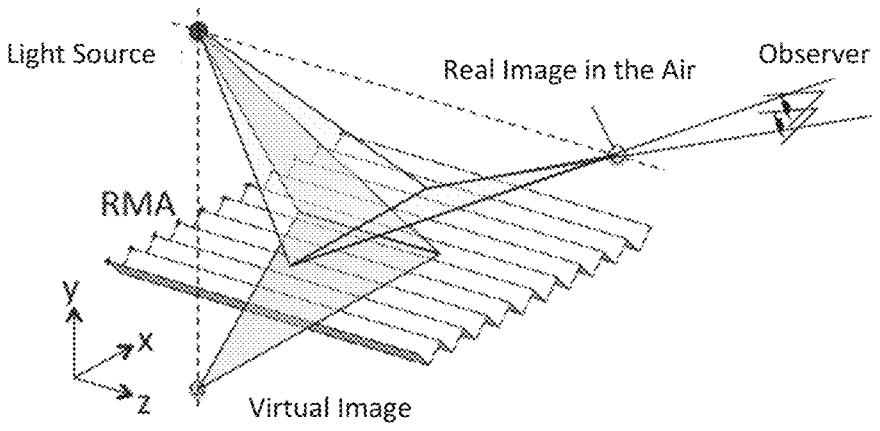
FIG. 12 illustrates an exemplary structure of a one-dimensional retroreflector.

In this example, the conjugate imaging element in the second optical component 102 may function as the aforementioned aperture stop, thus the second optical component (and in particular the conjugate imaging element) 102 may be integrated with the aperture stop as a single optical component. Referring to FIG. 11, the optical system 1110 may include a free-form mirror 1101 (the first optical component), a one-dimensional retroreflector 1102 (the second optical component and the aperture stop), a one-dimensional optical element 1103 (the third optical component), and a semi-reflective semi-transmissive mirror 1004. The semi-reflective semi-transmissive mirror 1004 may be positioned optically downstream of the one-dimensional optical element 1103, and arranged to reflect light from the one-dimensional optical element 1103 to the conjugate imaging element (the one-dimensional retroreflector 1102) and transmit the light reflected back from the one-dimensional retroreflector 1102 to the free-form mirror 1101. The free-form mirror 1101 may be arranged optically downstream of the semi-reflective semi-transmissive mirror 1104 and configured to reflect the light transmitted from the semi-reflective semi-transmissive mirror 1104 to the image plane 20. An example of the one-dimensional retroreflector 1102 is shown in FIG. 12, where a portion of the light rays irradiated arbitrarily the surface of the one-dimensional retroreflector is reflected at the original angle.

In this way, points on the display plane of the image display unit 120 that are imaged through the optical system 1110 along the x-direction have a relatively large image-side aperture angle, satisfying the binocular parallax condition, whereby a floating image can be formed at the image plane 20. Points on the display plane of the image display unit 120 that are imaged through the optical system 1110 along the y-direction have a relatively small image-side aperture angle to obtain high imaging quality.

Fifth Example

Figure 13:
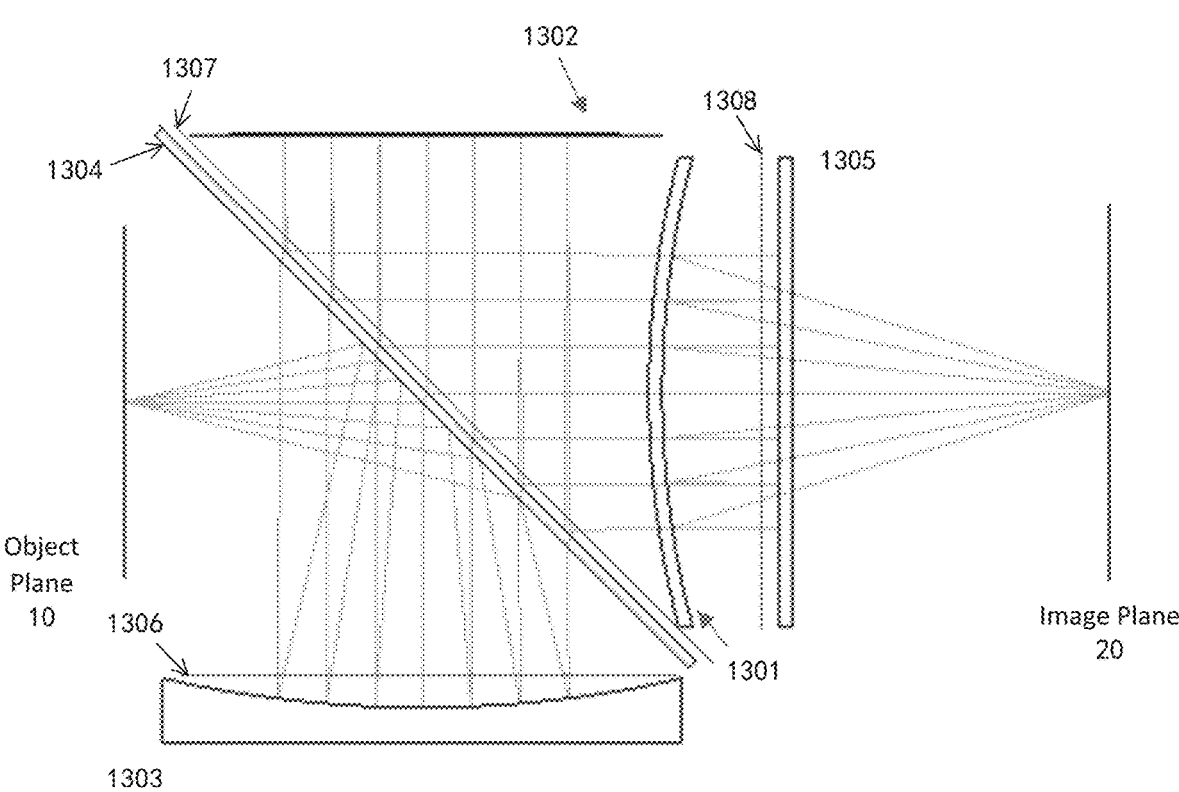
FIG. 13 illustrates a schematic diagram of an optical system 1310 and propagation of light rays in a y-z plane according to a fifth example of the present invention.

FIG. 13 illustrates a schematic diagram of an optical system 1310 and propagation of light rays in a y-z plane according to a fifth example of the present invention. Several details of the optical system 1310 in the floating display apparatus according to the fifth example are identical to those of the optical system 110 or 210 as described above with respect to FIGS. 2-4, and will not be repeated herein. The differences of the optical system 1310 of the fifth example are mainly described below.

In this example, the optical system 1310 may include a first concave mirror 1301 (the first optical component), a one-dimensional retroreflector 1302 (the second optical component and the aperture stop), a second concave mirror 1303 (the third optical component), a first beam splitting plate 1304, and a second beam splitting plate 1305. The first concave mirror 1301 is arranged between the object plane 10 and the image plane 20, and its concave surface faces the image plane 20. The first concave mirror may be of equal thickness and coated with a 50/50 beam splitting film. The concave surface of the second concave mirror 1303 faces the one-dimensional retroreflector 1302. The first beam splitting plate 1304 is obliquely positioned between the object plane 10 and the first concave mirror 1301 and between the one-dimensional retroreflector 1302 and the second concave mirror 1303. The beam splitting plate is positioned between the first concave mirror 1301 and the image plane 20.

Optionally, the first beam splitting plate 1304 may be a polarizing beam splitting film, and the second beam splitting plate 1305 may be a polarizing beam splitting plate. In this case, the optical system 1310 may also include a first quarter wave plate 1306, a second quarter wave plate 1307, and a third quarter wave plate 1308. In particular, the second optical component (the conjugate imaging element thereof) and the aperture stop are integrated into a single component, i.e., the one-dimensional retroreflector 1302. That is, the one-dimensional retroreflector 1302 also functions as the aperture stop as described above. The first quarter wave plate 1306 may be positioned between the second concave mirror 1303 and the polarizing beam splitting film, the second quarter wave plate 1307 may be positioned between the one-dimensional retroreflector 1302 and the polarizing beam splitting film, and the third quarter wave plate 1308 may be positioned between the first concave mirror 1301 and the polarizing beam splitting plate. The second quarter wave plate 1307 may be obliquely positioned in the same manner as the first beam splitting plate 1304. The optical axes of the second quarter wave plate 1307 and the third quarter wave plate 1308 are set orthogonally.

When the display plane of the image display unit 120 is positioned at or relayed to the object plane of the optical system 1310, the s-polarized light emitted from the display plane is reflected by the polarizing beam splitting film and irradiates the second concave mirror 1303, and the light rays reflected by the second concave mirror 1303 are further converted to p-polarized light by the first quarter wave plate 1306 and transmitted through the polarizing beam splitting film and the second quarter wave plate 1307 to the one-dimensional retroreflector 1302; the light rays are reflected by the one-dimensional retroreflector 1302, converted to s-polarized light again by the second quarter wave plate 1307, and reflected by the polarizing beam splitting film; the light rays reflected by the polarizing beam splitting film passes through the second quarter wave plate 1307 again to irradiate the first concave mirror 1301, and a portion of the light rays irradiates the third quarter wave plate 1308 through the first concave mirror 1301, the light rays being still s-polarized light after passing through the third quarter wave plate 1308, and is reflected by the polarizing beam splitting plate; the light rays reflected by the polarizing beam splitting plate irradiate the first concave mirror 1301 and are reflected again, and become p-polarized light after passing through the third quarter wave plate 1308, and are emitted through the polarizing beam splitting plate to form a floating image at the image plane 20 in the air.

Note that the use of the polarizing beam splitting film, the polarizing beam splitting plate, the first quarter wave plate 1306, the second quarter wave plate 1307, and the third quarter wave plate 1308 is intended to improve the optical efficiency of the optical system while eliminating an impact of unexpected light rays (e.g., external light rays), and is not necessary, as those skilled in the art can appreciate that an optical system without use of these optical elements is also sufficient for the purpose of forming a floating image.

In this way, points on the display plane of the image display unit 120 that are imaged through the optical system 1310 along the x-direction have a relatively large image-side aperture angle, satisfying the binocular parallax condition, whereby a floating image can be formed at the image plane 20. Points on the display plane of the image display unit 120 that are imaged through the optical system 1310 along the y-direction have a relatively small image-side aperture angle to obtain high imaging quality. The optical system 1310 is a purely reflective structure with no chromatic aberration, making it easy to achieve large size production.

Sixth Example

Figure 14:
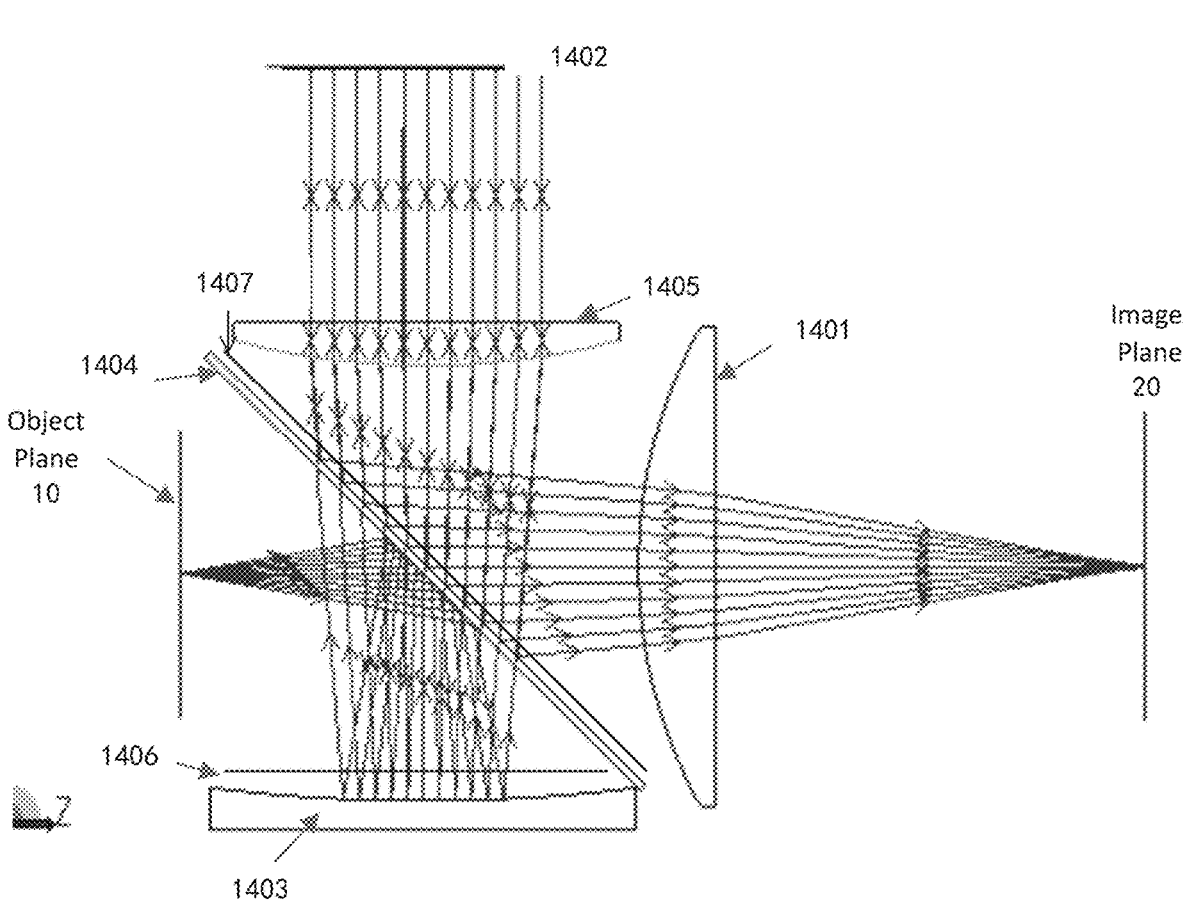
FIG. 14 illustrates a schematic diagram of an optical system 1410 and propagation of light rays in a y-z plane according to a sixth example of the present invention.

FIG. 14 illustrates a schematic diagram of an optical system 1410 and propagation of light rays in a y-z plane according to a sixth example of the present invention. Several details of the optical system 1410 in the floating display apparatus according to the sixth example are identical to those of the optical system 110 or 210 as described above with respect to FIGS. 2-4 and the optical system 1310 as described above with respect to FIG. 13, and will not be repeated herein. The differences of the optical system 1410 of the sixth example are mainly described below.

In this example, the optical system 1410 may include a convex mirror 1401, a one-dimensional retroreflector 1402 (the second optical component and the aperture stop), a concave mirror 1403, a beam splitter 1404, and a correction lens 1405. The convex mirror 1401 is arranged between the object plane 10 and the image plane 20 and its convex surface faces the object plane 10. The concave surface of the concave mirror 1403 faces the one-dimensional retroreflector 1402. The beam splitter 1404 is obliquely positioned between the object plane 10 and the convex mirror 1401 and between the one-dimensional retroreflector 1402 and the concave mirror 1403. The correction lens 1405 is positioned between the beam splitter 1404 and the one-dimensional retroreflector 1402 for correcting the aberration of the optical system 1410. The correction lens 1405 may be a positive lens or a negative lens. In this example, the convex mirror 1401 and the correction lens 1405 constitute the first optical component, while the concave mirror 1403 and the correction lens 1405 constitute the third optical component. In other words, in this example, the correction lens 1405 may be used as both an optical element in the first optical component and an optical element in the third optical component.

Optionally, the beam splitter 1404 may be a polarizing beam splitting film. In this case, the optical system 1410 may also include a first quarter wave plate 1406 and a second quarter wave plate 1407. In particular, the second optical component (the conjugate imaging element thereof) and the aperture stop are integrated into a single component, i.e., the one-dimensional retroreflector 1402. That is, the one-dimensional retroreflector 1402 also functions as the aperture stop as described above.

When the display plane of the image display unit 120 is positioned at or relayed to the object plane of the optical system 1310, the s-polarized light emitted from the display plane is reflected by the polarizing beam splitting film and irradiates the concave mirror 1403; the light rays reflected by the concave mirror 1403 are converted to p-polarized light by passing through the first quarter wave plate 1406 for a second time, and transmit through the polarizing beam splitting film and the second quarter wave plate 1407 to the correction lens 1405; the light rays passing through the correction lens 1405 are reflected by the one-dimensional retroreflector 1402 and pass through the correction lens 1405 again, and are converted to s-polarized light by passing through the second quarter wave plate 1407, and are reflected by the polarizing beam splitting film; the light rays reflected by the polarizing beam splitting film converge at the image plane 20 in the air through the convex mirror 1401 to form a floating image.

Note that the use of the polarizing beam splitting film, the first quarter wave plate 1406, and the second quarter wave plate 1407 is intended to improve the optical efficiency of the optical system while eliminating an impact of unexpected light (e.g., external light), and is not necessary, as those skilled in the art can appreciate that an optical system without use of these optical elements is also sufficient for the purpose of forming a floating image.

In this way, points on the display plane of the image display unit 120 that are imaged through the optical system 1410 along the x-direction have a relatively large image-side aperture angle, satisfying the binocular parallax condition, whereby a floating image can be formed at the image plane 20. Points on the display plane of the image display unit 120 that are imaged through the optical system 1410 along the y-direction have a relatively small image-side aperture angle to obtain high imaging quality.

In the fifth and sixth examples above, the optical system 1310 or 1410 may be a symmetrical structure, with the one-dimensional retroreflector 1302 or 1402 in the second optical component being at a middle position of the optical system 1310 or 1410, i.e., the optical path length between the conjugate imaging element and the object plane is substantially equal to the optical path length between the conjugate imaging element and the image plane. In addition, the focal length of the first optical component is substantially equal to the focal length of the third optical component, and the object plane 10 and the image plane 20 are substantially equal in size.

Seventh Example

Figure 15:
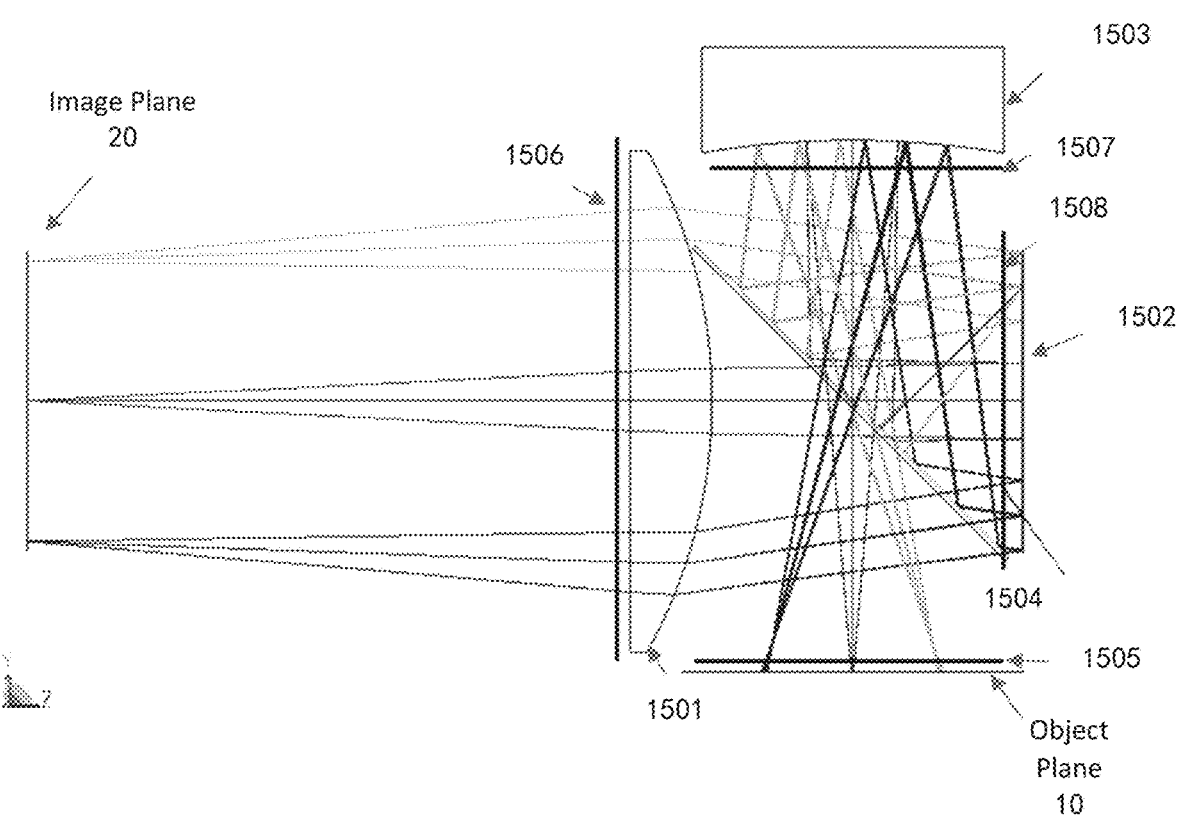
FIG. 15 illustrates a schematic diagram of an optical system 1510 and propagation of light rays in a y-z plane according to a seventh example of the present invention.

FIG. 15 illustrates a schematic diagram of an optical system 1510 and propagation of light rays in a y-z plane according to a seventh example of the present invention. Several details of the optical system 1510 in the floating display apparatus according to the seventh example are identical to those of the optical system 310 as described above with respect to FIG. 5, and will not be repeated herein. The differences of the optical system 1510 of the seventh example are mainly described below.

In this example, the optical system 1510 may include a piano-convex cylindrical mirror 1501 (the first optical component), a serrated grating 1502 (the second optical component), a cylindrical concave mirror 1503 (the third optical component and the aperture stop), a polarizing beam splitting plate 1504, a first polarizer 1505, a second polarizer 1506, a first quarter wave plate 1507, and a second quarter wave plate 1508. In particular, the third optical component (i.e., the one-dimensional optical element thereof) and the aperture stop are integrated into a single component, i.e., the cylindrical concave mirror 1503, and its concave surface faces the object plane 10. That is, the cylindrical concave mirror 1503 also functions as an aperture stop in the y-direction. The conjugate imaging element is a serrated grating 1502 arranged to face the image plane 20, and the one-dimensional optical element in the first optical component is a piano-convex cylindrical mirror 1501 arranged between the image plane 20 and the serrated grating 1502, with the planar side of the plano-convex cylindrical mirror 1501 facing the image plane 20 and the convex side of the piano-convex cylindrical mirror 1501 facing the serrated grating 1502. The polarizing beam splitting plate 1504 is obliquely positioned between the object plane 10 and the cylindrical concave mirror 1503 and between the serrated grating 1502 and the piano-convex cylindrical mirror 1501. The first polarizer 1505 is positioned between the object plane 10 and the polarizing beam splitting plate 1504 for converting light from the object plane 10 to p-polarized light. The second polarizer 1506 is positioned optically downstream of the piano-convex cylindrical mirror 1501 for blocking transmission of s-polarized light. The first quarter wave plate 1507 is positioned between the cylindrical concave mirror 1503 and the polarizing beam splitting plate 1504 for converting the light reflected back from the cylindrical concave mirror 1503 to s-polarized light. The second quarter wave plate 1508 is positioned between the polarizing beam splitting plate 1504 and the serrated grating 1502 for converting the light reflected back from the serrated grating 1502 to p-polarized light.

When the display plane of the image display unit is positioned at or relayed to the object plane of the optical system 1510, the light rays emitted from the display plane pass through the first polarizer 1505 and are converted to p-polarized light, and pass through the polarizing beam splitting plate 1504, the polarizing beam splitting plate 1504 transmitting p-polarized light and reflecting s-polarized light, thus the light rays emitted from the display plane transmit through the polarizing beam splitting plate 1504, pass through the first quarter wave plate 1507, and irradiate the cylindrical concave mirror 1503. The light rays returning from the cylindrical concave mirror 1503 pass through the first quarter wave plate 1507 again, and are converted to s-polarized light, and are reflected by the polarizing beam splitting plate 1504, and irradiate the serrated grating 1502 through the second quarter wave plate. The light rays reflected from the serrated grating 1502 pass through the second quarter wave plate 1508 again, and are converted to p-polarized light which transmits through the polarizing beam splitting plate 1504, and irradiate the piano-convex cylindrical mirror 1501. Finally, the light rays passes through the piano-convex cylindrical mirror 1501 to form a floating image at the image plane 20 in the air. The second polarizer 1506 serves to allow only p-polarized light to transmit through so as to filter out stray light of s-polarized light, and cooperates with the second quarter wave plate 1508 when external light irradiates the serrated grating 1502 to eliminate an impact of external light.

In this way, points on the display plane of the image display unit 120 that are imaged through the optical system 1510 along the x-direction have a relatively large image-side aperture angle, satisfying the binocular parallax condition, whereby a floating image can be formed at the image plane 20. Points on the display plane of the image display unit 120 that are imaged through the optical system 1510 along the y-direction have a relatively small image-side aperture angle to obtain high imaging quality.

Eighth Example

Figure 16:
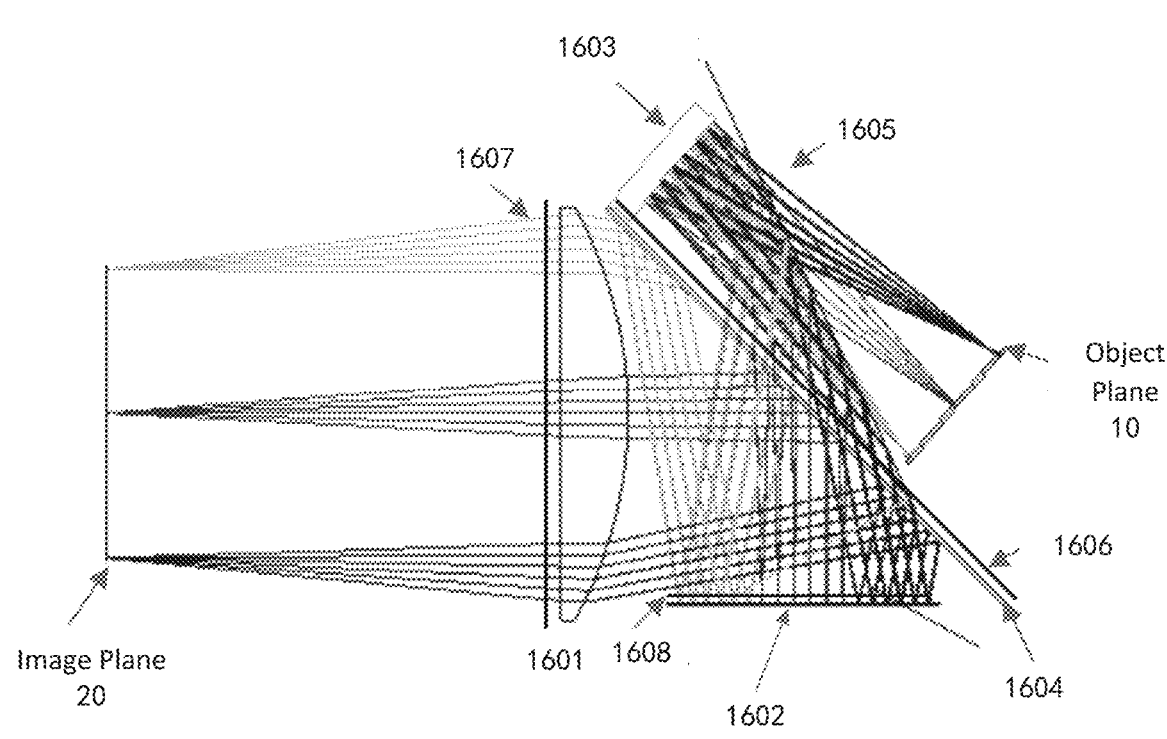
FIG. 16 illustrates a schematic diagram of an optical system 1610 and propagation of light rays in a y-z plane according to an eighth example of the present invention.

FIG. 16 illustrates a schematic diagram of an optical system 1610 and propagation of light rays in a y-z plane according to an eighth example of the present invention. Several details of the optical system 1610 in the floating display apparatus according to the eighth example are identical to those of the optical system 310 as described above with respect to FIG. 5, and will not be repeated herein. The differences of the optical system 1610 of the eighth example are mainly described below.

In this example, the optical system 1610 may include a piano-convex cylindrical mirror 1601 (the first optical component), a one-dimensional retroreflector 1602 (the second optical component), a cylindrical concave mirror 1603 (the third optical component and the aperture stop), a polarizing beam splitting film 1604, a beam splitter 1605, a first polarizer 1606, a second polarizer 1607, and a quarter wave plate 1608. In particular, the third optical component (i.e., the one-dimensional optical element thereof) and the aperture stop are integrated into a single component, i.e., the cylindrical concave mirror 1603, and its concave surface faces the object plane 10. That is, the cylindrical concave mirror 1603 also functions as an aperture stop in the y-direction. The conjugate imaging element with a one-dimensional grating structure is the one-dimensional retroreflector 1602, and the one-dimensional optical element in the first optical component is the piano-convex cylindrical mirror 1601 arranged between the image plane 20 and the polarizing beam splitting film 1604, with the planar side of the piano-convex cylindrical mirror 1601 facing the image plane 20 and the convex side of the piano-convex cylindrical mirror 1601 facing the polarizing beam splitting film 1604. The beam splitter 1605 is obliquely positioned between the object plane 10 and the cylindrical concave mirror 1603 for transmitting light from the object plane 10 to the cylindrical concave mirror 1603 and reflecting light reflected back from the cylindrical concave mirror 1603 to the one-dimensional retroreflector 1602. The polarizing beam splitting film 1604 is obliquely positioned between the beam splitter 1605 and the one-dimensional retroreflector 1602 for passing p-polarized light and reflecting s-polarized light. The polarizing beam splitting film 1604 reflects the s-polarized light reflected back from the one-dimensional retroreflector 1602 to the plano-convex cylindrical mirror 1601. The first polarizer 1606 is positioned between the beam splitter 1605 and the polarizing beam splitting film 1604 for converting light from the object plane 10 to p-polarized light. The quarter wave plate 1608 is positioned between the polarizing beam splitting film 1604 and the one-dimensional retroreflector 1602 for converting the light reflected back from the one-dimensional retroreflector 1602 to s-polarized light. The second polarizer 1607 is positioned optically downstream of the piano-convex cylindrical mirror 1601 for passing s-polarized light.

When the display plane of the image display unit is positioned at the object plane 10 of the optical system 1610, the light emitted from the display plane passes through the beam splitter 1605 to irradiate the cylindrical concave mirror 1603, and is reflected by the concave mirror 1603 to irradiate the beam splitter 1605 again, and is reflected to the first polarizer 1606, which is a polarizer for passing the light rays in the p-polarized state; the p-polarized light further passes through the polarizing beam splitting film (passing the p-light and reflecting the s-light) and irradiates the quarter wave plate 1608, and the light rays are reflected by the one-dimensional retroreflector 1602 and passes through the quarter wave plate 1608 again to become s-polarized light; the s-polarized light is reflected by the polarizing beam splitting film 1604 and irradiates the lens 1601, and emits through the second polarizer 1607 to form a floating image in space. The second polarizer 1607 can transmit the s-polarized light. The directions of the absorption axes of the second polarizer 1607 and the first polarizer 1606 are orthogonal, which can prevent large-angle light rays emitted from the display plane from passing directly through the second polarizer 1607 and the first polarizer 1606 into human eyes and forming a ghost image.

In this way, points on the display plane of the image display unit 120 that are imaged through the optical system 1610 along the x-direction have a relatively large image-side aperture angle, satisfying the binocular parallax condition, whereby a floating image can be formed at the image plane 20, and points on the display plane of the image display unit 120 that are imaged through the optical system 1610 along the y-direction have a relatively small image-side aperture angle to obtain high imaging quality.

Ninth Example

Figure 17:
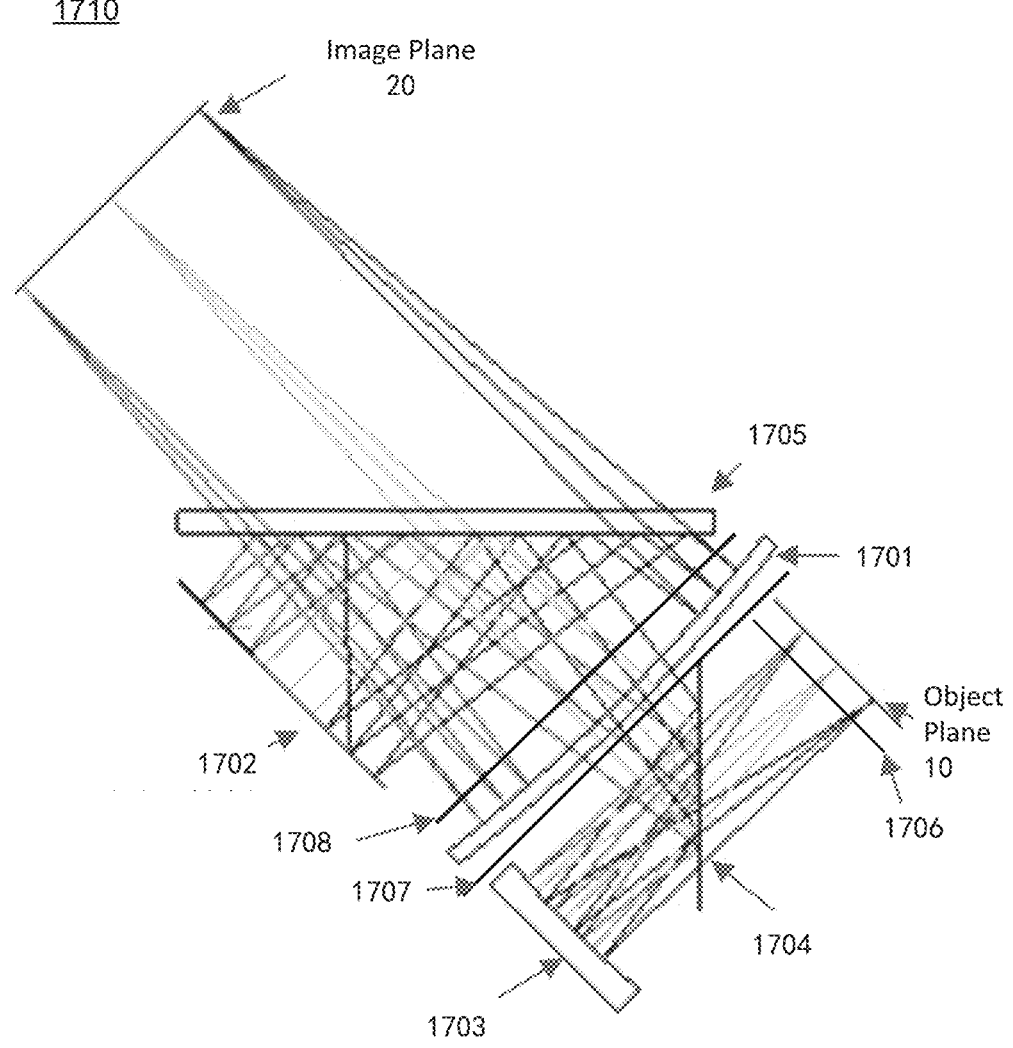
FIG. 17 illustrates a schematic diagram of an optical system 1710 and propagation of light rays in a y-z plane according to a ninth example of the present invention.

FIG. 17 illustrates a schematic diagram of an optical system 1710 and propagation of light rays in a y-z plane according to a ninth example of the present invention. Several details of the optical system 1710 in the floating display apparatus according to the ninth example are identical to those of the optical system 310 as described above with respect to FIG. 5, and will not be repeated herein. The differences of the optical system 1710 of the ninth example are mainly described below.

In this example, the optical system 1710 may include a beam splitting concave mirror 1701 (the first optical component), a one-dimensional retroreflector 1702 (the second optical component), a cylindrical concave mirror 1703 (the third optical component and the aperture stop), a beam splitting plate 1704, a polarizing beam splitting plate 1705, a first polarizer 1706, a first quarter wave plate 1707, and a second quarter wave plate 1708. In particular, the third optical component (i.e., the one-dimensional optical element thereof) and the aperture stop are integrated into a single component, i.e., the cylindrical concave mirror 1703, and its concave surface faces the object plane 10. That is, the cylindrical concave mirror 1703 also functions as an aperture stop in the y-direction. The phase conjugate optical element is the one-dimensional retroreflector 1702, and the one-dimensional optical element in the first optical component is the beam splitting concave mirror 1701 arranged between the beam splitting plate 1704 and the polarizing beam splitting plate 1705, with the concave surface of the beam splitting concave mirror 1701 facing the image plane 20.

The beam splitting plate 1704 is obliquely positioned between the object plane 10 and the cylindrical concave mirror 1703 for transmitting light from the object plane 10 to the cylindrical concave mirror 1703 and reflecting light reflected back from the cylindrical concave mirror 1703 to the beam splitting concave mirror 1701. The polarizing beam splitting plate 1705 is obliquely positioned between the beam splitting concave mirror 1701 and the image plane 20 for passing p-polarized light and reflecting s-polarized light, and the polarizing beam splitting plate 1705 reflects the s-polarized light reflected back from the one-dimensional retroreflector 1702 to the beam splitting concave mirror 1701. The first polarizer 1706 is positioned between the beam splitting plate 1704 and the object plane 10 for converting light from the object plane 10 to p-polarized light. The first quarter wave plate 1707 is positioned between the beam splitting plate 1704 and the beam splitting concave mirror 1701. The second quarter wave plate 1708 is positioned between the polarizing beam splitting plate 1705 and the beam splitting concave mirror 1701.

When the display plane of the image display unit is positioned at the object plane 10 of this optical system 1710, the light emitted from the display plane passes through 1706 (a quarter wave plate in combination with a polarizer), and the emitted light rays are p-polarized light, which passes through the beam splitting plate 1704 and irradiates the cylindrical concave reflective mirror 1703. The light rays are reflected by the cylindrical concave reflective mirror 1703, and are then reflected by the beam splitting plate 1704, and irradiate the first quarter wave plate 1707, which converts the p-polarized light to circularly polarized light, and then the light rays irradiate the beam splitting concave mirror 1701. The beam splitting concave mirror 1701 is a plate structure with equal thickness having a certain curvature, and its surface is coated with a semi-reflective semi-transmissive film. The light rays pass through the beam splitting concave mirror 1701 and then irradiate the second quarter wave plate 1708, which converts the circularly polarized light to s-polarized light, and the light rays are reflected by the polarizing beam splitting plate 1705 and irradiate the one-dimensional retroreflector 1702 and are reflected, and are reflected by the polarizing beam splitting plate for the second time and then pass through the second quarter wave plate 1708, which converts the light to the circularly polarized light, and a portion of the light is reflected by the beam splitting concave mirror 1701, and passes through the second quarter wave plate 1708 again to be converted to p-polarized light, and is emitted through the polarizing beam splitting plate 1705 to form a floating image in the air.

In this way, points on the display plane of the image display unit 120 that are imaged through the optical system 1710 along the x-direction have a relatively large image-side aperture angle, satisfying the binocular parallax condition, whereby a floating image can be formed at the image plane 20.

Optionally, in the above illustrative embodiment and example, in the case that the object plane of the optical system 110 is planar, the floating image may be formed as being curved because the optical system may have a field curvature in the y-direction. Therefore, in order to correct the field curvature in the y-direction, the object plane of the optical system 110 may be set to be a curved plane in the y-direction. For example, if the display plane of the image display unit 120 overlaps with the object plane of the optical system 110, then the display plane may be set to be a curved plane. Alternatively, the display plane may be formed as a curved image at the object plane of the optical system 110 by the relay imaging unit.

According to another exemplary embodiment of the present invention, a multi-layer display device is also provided.

Figure 18:
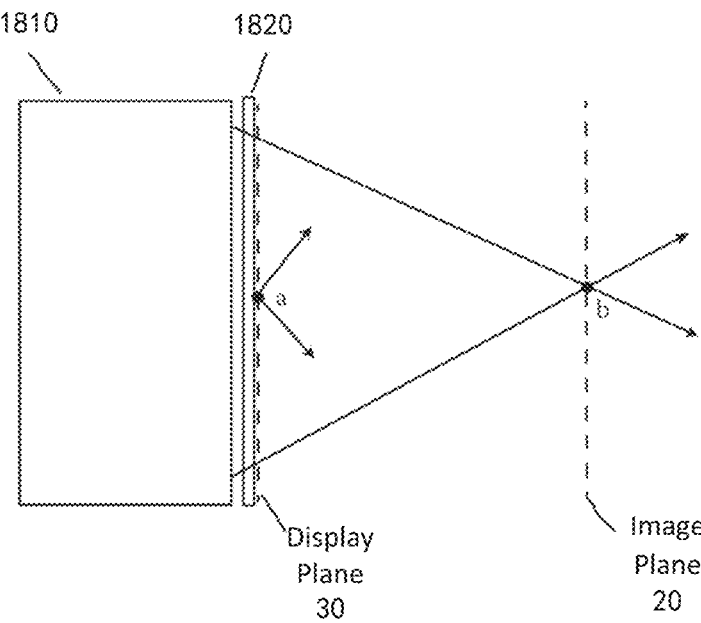
FIG. 18 illustrates a schematic diagram of a multi-layer display device 1800 according to an embodiment of the present invention.

FIG. 18 illustrates a schematic diagram of a multi-layer display device 1800 according to an embodiment of the present invention.

The multi-layer display device 1800 may include any of the previously described floating display apparatus 1810 and a transparent display 1820. The transparent display component 1820 may be positioned optically downstream of the floating display apparatus 1810. The display plane 30 of the transparent display component 1820 is located at a position different from a position of the image plane 20. The transparent display component 1820 may have a high transmittance, such as a transparent OLED/LED/LCD display or a film (slide).

The multi-layer display device 1800 according to an exemplary embodiment of the present invention is described above. With use of the multi-layer display device 1800, the floating display apparatus 1810 may form a floating image at the image plane 20, and the transparent display 1820 may display different information at the display plane 30. As such, secondary information may be displayed on the display plane 30 while important information may be presented at the image plane 20, thereby enhancing the efficiency and experience of people in obtaining information.

The floating display apparatus, the optical system used therein, and the multi-layer display device according to an exemplary embodiment of the present invention is described above in detail. The optical system in this floating display apparatus is easy to process and its cost can be effectively reduced, while the problem of ghost image existing in the prior art can be eliminated a more flexible optical layout can be obtained. It belongs to an optical field three-dimensional display technology to employ the floating display apparatus to realize reconstruction of the optical field of the display plane in the air. The light beam on the display plane that is imaged through the optical system along the first direction has a relatively large image-side aperture angle, which satisfies the binocular parallax condition, whereby floating display of the image can be realized. In particular, for the optical system in the floating display apparatus of the present invention, the aperture stop mentioned herein only serves the role of confining light rays in the second direction, while the role of confining light rays in the first direction can be served by the first optical component or a conjugate imaging element with a one-dimensional grating structure. In contrast to conventional optical systems, the optical elements that function as aperture stops in the first and second directions may not be the same optical element.

It is to be understood that the above description is intended to be illustrative, and not restrictive. For example, the above-described embodiments (and/or aspects thereof) may be used in combination with each other. In addition, various modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled.

What is claimed is:

1. A floating display apparatus comprising:
an image display unit to have a display plane of an image and to emit display light constituting an initial image from the display plane; and
an optical system to define an object plane and an image plane, the optical system being arranged to receive the display light emitted from the display plane at the object plane, wherein the optical system includes a plurality of optical components that are configured to have different abilities to converge light rays in a first direction and a second direction, the first direction and the second direction are orthogonal to an optical axis of the floating display apparatus respectively, wherein the optical system has an aperture stop for confining light rays from the object plane in the second direction,
wherein the display light, after propagating through the optical system, forms a floating image at the image plane in the air, an image-side aperture angle in the first direction is larger than an image-side aperture angle in the second direction, and
wherein the plurality of optical components include:
a first optical component including a one-dimensional optical element for modulating light rays in the second direction; and/or
a second optical component including a conjugate imaging element having a one-dimensional grating structure for converging light rays in the first direction.

2. The floating display apparatus of claim 1, wherein a distance between the aperture stop and a focal plane of the first optical component is d, and a light-through size in the second direction is Dy that satisfies the following condition:

$$Dy \geq \frac{h}{f} * d$$

wherein h is a length of the floating image in the second direction, and f is a focal length of the first optical component.

3. The floating display apparatus of claim 1, wherein the one-dimensional optical element and the conjugate imaging element are integrally formed as a cylindrical serrated grating.

4. The floating display apparatus of claim 1, wherein the one-dimensional optical element is a cylindrical lens, and the conjugate imaging element is a one-dimensional grating transmissive array structure.

5. The floating display apparatus of claim 1, wherein the optical system further includes a third optical component, the third optical component including a one-dimensional optical element for modulating light rays from the object plane in the second direction.

6. The floating display apparatus of claim 5, wherein the one-dimensional optical element in the third optical component and the aperture stop are integrated into a single component.

7. The floating display apparatus of claim 5, wherein the first optical component and the third optical component are positioned substantially symmetrical with respect to the conjugate imaging element along an optical axis.

8. The floating display apparatus of claim 1, wherein the conjugate imaging element with the one-dimensional grating structure and the aperture stop are integrated into a single component.

9. The floating display apparatus of claim 1, wherein the optical imaging system further includes:

a beam splitter being positioned between the conjugate imaging element and the image display unit along an optical path.

10. The floating display apparatus of claim 9, wherein the optical imaging system further includes:

a phase retarder being positioned between the conjugate imaging element and the beam splitter along an optical path; and/or the beam splitter is a polarizing beam splitter.

11. The floating display apparatus of claim 1, wherein a length of the floating image in the second direction is greater than or equal to a length of the initial image in the second direction.

12. The floating display apparatus of claim 1, wherein an optical path length between the conjugate imaging element and an object point at the optical axis on the object plane is substantially equal to an optical path length between the conjugate imaging element and an image point at the optical axis on the image plane.

13. The floating display apparatus of claim 1, wherein the object plane is set to be a curved plane in the second direction.

14. A multi-layer display device comprising:

a floating display apparatus of claim 1; and a transparent display component being positioned optically downstream of the floating display apparatus, wherein a display plane of the transparent display component is located at a position different from a position of the image plane.

\* \* \* \* \*